United States Patent Office 3,049,636
Patented Aug. 14, 1962

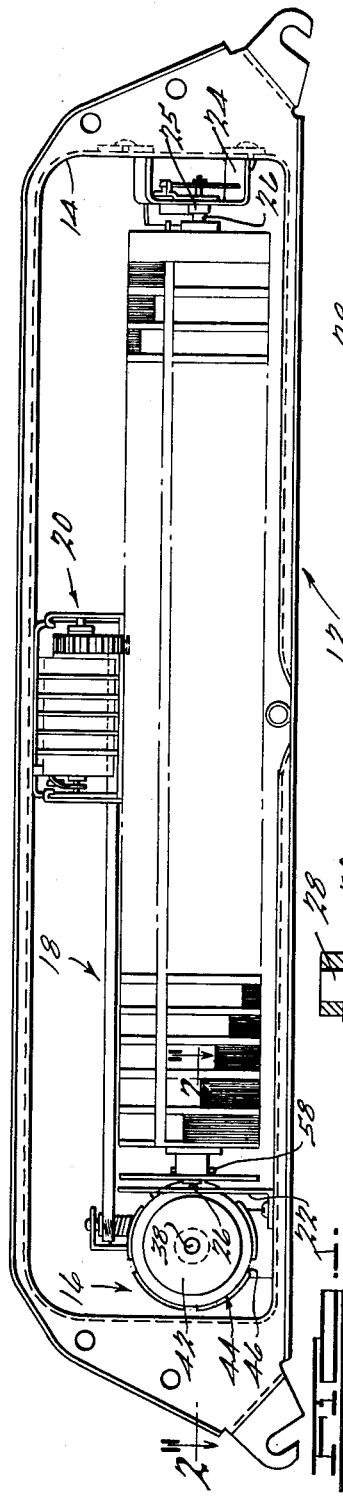

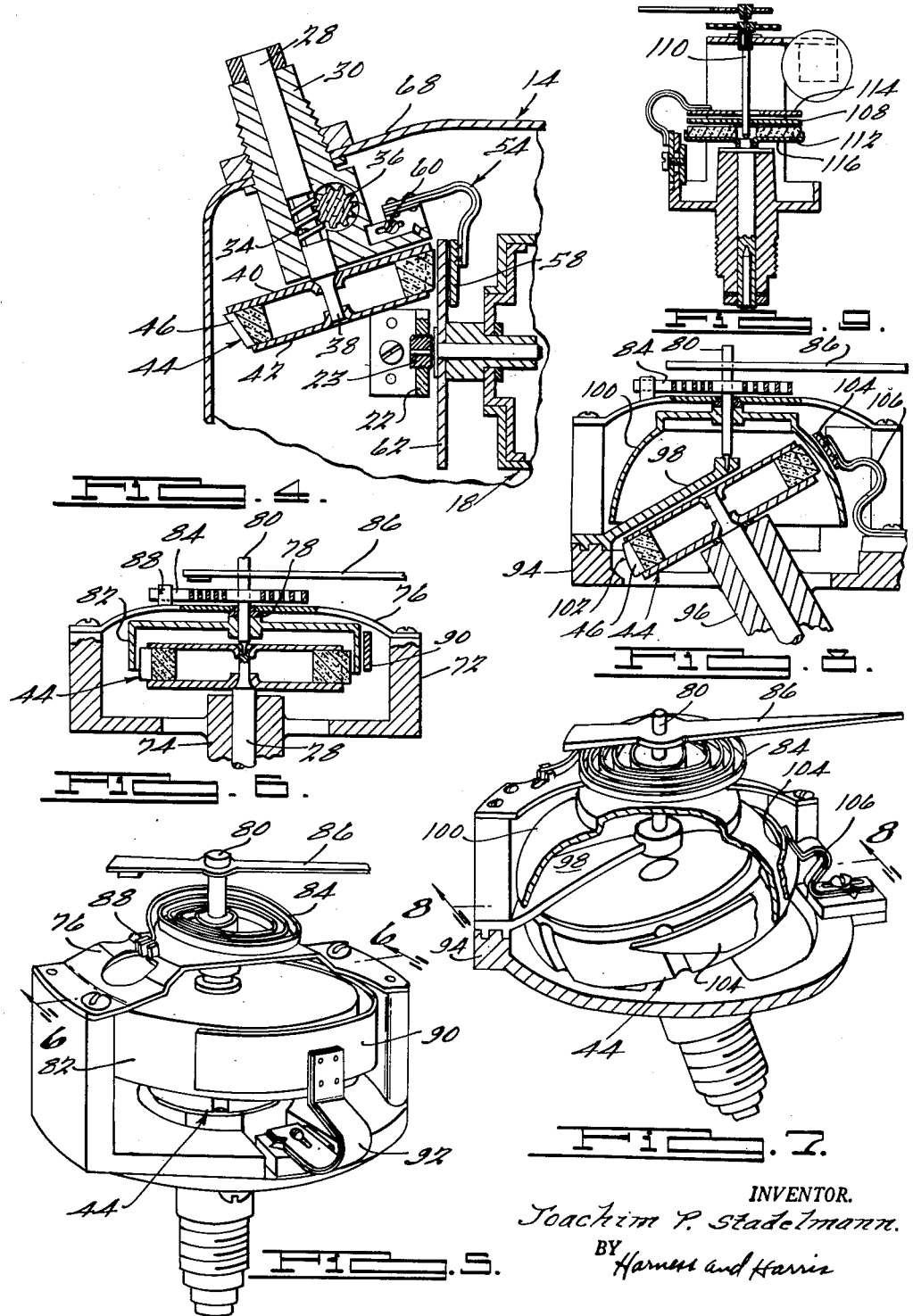

3,049,636
MAGNETICALLY DRIVEN DEVICES
Joachim P. Stadelmann, Madison Heights, Mich., assignor to Chrysler Corporation, Highland Park, Mich., a corporation of Delaware
Filed June 22, 1959, Ser. No. 822,104
4 Claims. (Cl. 310—97)

This invention relates to magnetically driven devices such as speedometers, and in particular concerns magnetic torque drive mechanisms therefor.

It is customary in magnetic torque drives to provide an eddy current speed or drag cup to which an indicating element is attached and to drive this speed cup with a moving steel or steel alloy magnet which induces eddy currents in the speed cup and causes it to move through the magnetic field. In certain types of devices it is desirable to connect to the speed cup relatively large movable elements such as drums and consequently larger and heavier and more expensive steel and steel alloy magnets must be used to produce the necessary force to move the speed cup and attached elements.

It is a principal feature of applicant's invention to substitute ceramic magnets of sintered $BaCo_3$ and $Fe_2O_3$ for the conventional iron or steel type magnets with a consequent reduction in weight, and reduction in cost, which are significant factors in the manufacture of magnetic torque drive structures. Applicant's invention also provides a novel temperature compensating adjustment structure which allows the use of these ceramic type magnets and also conventional steel magnets for applications wherein the ambient temperatures vary significantly. Applicant's compensating means is particularly necessary when ceramic magnets are used in speedometers since the magnetic flux output of the ceramic magnets within the ambient temperature range normally occurring, varies considerably and if left uncompensated for would result in significant errors in speed indication. The variation in flex output of ceramic magnets is actually so great that it is only through applicant's novel compensating means that these magnets are now made usable in speedometers.

It is a principal object of this invention, therefore, to provide a relatively low cost magnetic torque responsive device having a powerful magnetic drive for effectively actuating relatively heavy indicators.

Another object is to provide a speedometer having a ceramic magnetic drive with flux regulating means to provide accurate speed indication at all ambient automotive operating temperatures.

A specific object is to provide a ceramic magnet powered instrument with an automatically controlled air gap between magnet and flux collector.

A further specific object is to provide a ceramic magnet powered instrument with an automatic temperature adjustable field plate and a temperature compensator plate having a negative temperature coefficient of magnetic permeability.

Applicant accomplishes these objects primarily by combining in a magnetic torque drive mechanism a ceramic magnet of $BaCo_3$ and $Fe_2O_3$, an eddy current disc member, a bimetal supported adjustable field plate or flux collector, and compensation material. The necessity for each of these structural elements may be clarified by the following discussion.

In the operating temperature range of about $-40°$ F. to about $130°$ F. the relationship between applicant's field plate movement and flux density in the air gap between the magnet and the field plate is quite complicated since the movement of the field plate with respect to the magnet, caused by the thermal deflection of the field plate bimetal support is linear with respect to temperature changes, while the variation of the flux density within the air gap with respect to the movement of the field plate relative to the magnet is non-linear. For example, for a change in gap width from 0.150 in. to 0.145 in. the flux density within the air gap increases approximately 20 gauss, while for a change in gap width from .150 in. to .140 in. the flux density increases approximately 50 gauss. This example shows that the change in flux density within the air gap is an exponential function of the gap width while the deflection of the bimetal is practically a linear function of the temperature change. Moreover, to further complicate matters, a progressive decrease in temperature from about $65°$ F. to about $-40°$ F. causes progressive increases in flux output of the ceramic magnet and increased eddy current flow in the eddy current disc, both of which factors noticeably increases the torque on the eddy current disc and gives an erroneously high speedometer reading. It is thus seen that a partial compensation of this increased torque is obtained by the reduction in flux density caused by the deflection of the field plate. However, the bimetal adjustment is not sufficient to make a complete compensation and, therefore, applicant has augmented this bimetal adjustment by means of a compensation material which is associated with the magnet and which is characterized by its ability to progressively increase its magnetic permeability as the temperature decreases from about $65°$ F. to about $-40°$ F. without any noticeable change in permeability above $65°$ F. It might be said that the compensation material has a negative temperature coefficient of magnetic permeability in this temperature range. Applicant has thus found that a substantially complete compensation for temperature variations within the range of about $65°$ F. to about $-40°$ F. can be obtained by the combined use of a bimetal controlled field plate and compensation material. It is noted that as the temperature rises above $65°$ F., the current flow in the eddy current disc due to its electrical resistance is progressively reduced to such a degree that the increased flux density caused by the bimetal movement of the field plate closer to the magnet is substantially offset and a reasonably true speedometer reading is obtained without the use above $65°$ F. of compensation material having a variable flux permeability. By the use of applicant's compensation structure the speed indication in the range of $-20°$ F. to $130°$ F. is less than 1.8 miles per hour and the use of the inexpensive ceramic type magnet is thereby made commercially feasible.

Further objects and advantages of the present invention will become apparent from the following description and drawings, in which:

FIGURE 1 represents a view looking at the inside of a drum type speedometer;

FIGURE 2 represents a cross sectional view of the magnetic drive mechanism of the speedometer of FIGURE 1 taken along the line 2—2 thereof in the direction of the arrow;

FIGURE 3 represents a variation in the magnetic drive mechanism of the speedometer of FIGURE 1;

FIGURE 4 represents another variation in the magnetic drive mechanism of the speedometer of FIGURE 1;

FIGURE 5 represents an isometric view of a pointer type of speed indicator embodying the present invention;

FIGURE 6 represents a cross sectional view of the speedometer of FIGURE 5 taken along the line 6—6 thereof in the direction of the arrows;

FIGURE 7 represents an isometric view of a variation of a pointer type speedometer;

FIGURE 8 represents a cross sectional view of the speedometer of FIGURE 7 taken along the line 8—8 thereof in the direction of the arrows; and FIGURE 9 represents another variation of the pointer type speedometer.

Referring to the drawings, and in particular to FIGURE 1, a drum type speedometer designated 12 comprises a housing 14 which contains the speedometer drive structure generally designated 16 and the drum type indicating structure generally designated 18 and the odometer structure generally designated 20. Bearing brackets 22 and 24 located at either end of the housing 14 provide bearing supports 23 and 25 respectively for the drum mechanism 18 which is provided at either end with a shaft 26 rotatively mounted in bearings 23 and 25. This general type of speedometer structure is shown and described in detail in applicant's copending application Serial No. 738,758, filed May 29, 1958.

Referring to FIGURE 2, it is seen that the drive cable 28 which is operatively connected to a driving portion of the vehicle such as the drive shaft is mounted in a threaded bushing 30 secured to housing 14 by means of a nut 32 threadedly received on the bushing 30. Speedometer cable or shaft 28 is provided with threads 34 to drive odometer gear 36. Frictionally secured to the reduced end 38 of shaft 28 is a compensator disc 40 comprising an iron-nickel or copper-nickel alloy possessing the characteristic of becoming more permeable to magnetic flux as the temperature decreases. The function of this disc 40 will be explained more fully below. A keeper plate 42 is frictionally secured on the reduced end 38 of the shaft 28 and retains between itself and disc 40 the annular ceramic magnet 44 which may be provided with dirt catching slots 46 around its periphery. Ceramic magnet 44 is comprised essentially of a sintered mass of iron oxide and barium carbonate and is available under the registered mark of "Indox" manufactured by the Indiana Steel Products Company of Valpariso, Indiana. This magnet and other ceramic magnets of a similar type have the characteristic of varying their flux output about 15% in the range from 130° F. to —25° F. which variation without adequate compensation would result in an error in speed measurement as high as 25 m.p.h. at 1,000 r.p.m.

Mounted on a portion of bushing 30 is a plate 48 which is provided with a slot 50 and an upstanding wall 52 to which a bimetal hanger 54 is secured by means of rivets or other suitable means 56. Secured by welding or other means to the other end of bimetal member 54 is a field plate 58 of iron or other magnetic flux concentrating material. A screw 60 threadedly received in bushing 30 through slot 50 allows plate 48 to be initially adjusted to thereby adjust position of the field plate 58 with respect to the eddy current disc 62. A V-shaped slot 64 is provided in plate 48 and a cooperating V-shaped slot 66 is provided in bushing 30 into which cooperating slots a screw driver may be inserted and twisted clockwise or counterclockwise to initially position the field plate 58 with respect to the magnet and eddy current disc at a predetermined temperature. The screw 60 may be thereafter tightened down to set the position of the field plate. Changes in temperature after this setting automatically cause adjustments of the position of the field plate through the action of the bimetal strip or hanger 54 which flexes and increases the distance between the field plate and magnet as the ambient temperature decreases to thereby reduce the flux density in the air gap.

Referring to FIGURE 3, the housing 14 is provided with a beveled end portion 68 into which the bushing 30 is secured and the speed disc 62 is consequently provided with a beveled portion 70 so as to be positionable between the magnet 44 and the field plate 58. Also, as shown in FIGURE 4, the shape of the magnet 44 is slightly altered to provide a beveled edge 45 to compensate for the beveled portion 68 of the housing 14. These structural shape variations of FIGURES 3 and 4 are often necessary due to certain space limitations within the vehicle to which the speedometers are applied.

In FIGURES 5 and 6 is shown a pointer type of speedometer which comprises a housing 7 provided with a bearing 74 in which the drive cable 28 is rotatably mounted. A top bearing support plate 76 is secured to the top of the housing 72 and provides a bearing 78 in which the pointer supporting shaft 80 is rotatably mounted. The magnet structure with the compensating disc attached to the shaft 28 is identical to that shown in FIGURES 1 and 2. The eddy current disc is formed into the shape of a cup 82 and is secured to shaft 80 to rotate the same in response to rotative motion of the magnetic drive 44. The shaft 80, it is noted, is pivotally mounted in the end of shaft 28 and the friction thereon is so slight that the magnetic drive 44 when rotating does not impart any significant rotation to the shaft 80. The only significant rotative movement of shaft 80 is obtained through the magnetic drag on the drag or speed cup 82 by the magnet drive 44. A very light coil spring 84 is provided to bias the pointer 86 which is attached to shaft 80 to its neutral or zero reading position. One end of the spring 84 is secured to the upper bearing support 76 by means of tabs 88 and the other end of the spring is secured through suitable means to the shaft 80. The field plate 90 is in the form of a semi ring and is secured to a bimetal strip 92, which strip is in turn mounted upon the base 72 by adjustable means identical to that shown in FIGURE 2 for initially setting the field plate 58.

The pointer type of speedometer structure shown in FIGURES 7 and 8 is substantially identical to that shown in FIGURES 5 and 6, except that the magnetic drive structure is angularly mounted with respect to the housing. In FIGURES 7 and 8 it is shown that the housing 94 is provided with a beveled drive shaft bearing 96 and is also provided with an upstanding segment 98 to provide a lower bearing support for the shaft 80 upon which the pointer 86 is mounted. The speed cup 100 is of a different shape than cup 82 to allow the magnet drive 44 to be inserted a substantial distance therein. It is noted that the ceramic magnetic drive 44 is provided with curved outer portions 102 so as to coincide with the curvature of the speed cup 100. It is also noted that the field plate 104 is also curved to provide a uniform spacing over its entire surface with respect to the curved speed cup 100. Again, as in the speedometer of FIGURES 1 and 5, the bi-metal mounting structure 106 is adjustably mounted to the base 94 by the means described above for the mounting of bimetal members 54 and 92.

Referring to FIGURE 9, a speed or eddy curent disc 108 is mounted on the pointer support shaft 110 so that the flat face of disc 108 is presented to the flux pattern flowing between the face of the ceramic magnet 112 and the annular field plate 114. The compensating plate 116 for the magnet 112 is located on the opposite face of the magnet 112. The magnet in this variation of speedometer structure is magnetized so that the north and south poles are presented on a face of the magnet rather than on the edge portions of the magnet as shown in the speedometer structures of FIGURES 1–8.

The temperature used to depict the spatial arrangement of the magnet, eddy current disc, and field plate in each of the variations shown in the drawings is approximately 130° F.

Though the ceramic type magnet has been emphasized, it is noted that applicant's compensating structure could readily be used with any type of permanent magnet having complicated flux variations with temperature in order to produce a more accurate speed indication over a wide range of ambient temperature operating conditions.

It is noted that other types of compensation materials may be used in combination with the bimetal controlled field plate to give a compensation at perhaps higher temperatures than 65° F. to provide the necessary compensation for magnets and eddy current discs having different flux chracteristics with respect to temperature than applicant's.

I claim:
1. In a speed responsive indicator, a ceramic permanent magnet comprising essentially $Fe_2O_3$ and $BaCO_3$ mounted for angular movement, means having a negative temperature coefficient of electrical resistance and subject to torque as a function of the speed of said magnet for indicating said speed including an eddy current member mounted for angular movement in the path of the magnetic flux of said magnet, a field plate mounted in said path, and compensating means for neutralizing comparatively large temperature induced changes in the torque relationship between said magnet and member in the temperature range from −40° F. to 130° F. to effect a substantially accurate indication of said speed independently of changes in the ambient temperature, said compensating means comprising temperature responsive means for adjusting the distance between said field plate and magnet inversely with changes in ambient temperature, said temperature responsive means being calibrated and arranged with respect to said magnet and member to compensate for thermally induced changes in the torque relationship therebetween to effect a substantially accurate indication of said speed in the temperature range between approximately 65° F. and 130° F. and to effect a negligible compensation for temperature changes below approximately 65° F., said compensating means also including a temperature compensating magnetic shunt having a negative temperature coefficient of magnetic permeability in the tempearture range between approximately 65° F. and −40° F. and cooperable with said magnet and field plate to compensate for thermally induced changes in the torque relationship between said magnet and member to effect a substantially accurate indication of said speed in the latter temperature range, said shunt having a negligible temperature coefficient of magnetic permeability above approximately 65° F.

2. In a speed responsive indicator, a ceramic permanent magnet having a comparatively large negative temperature coefficient of magnetic flux density and mounted for angular movement, means subject to torque as a function of the speed of said magnet for indicating said speed including an eddy current member mounted for angular movement in the path of the magnetic flux of said magnet, a field plate mounted in said path, and compensating means for neutralizing temperature induced changes in the torque relationship between said magnet and member to effect a substantially accurate indication of said speed independently of changes in the ambient temperature, said compensating means comprising temperature responsive means for adjusting the distance between said field plate and magnet inversely with changes in ambient temperature, said temperature responsive means being calibrated and arranged with respect to said magnet and member to exert its major influence on the torque relationship therebetween in the temperature range between approximtaely 65° F. and 130° F. to effect a substantially accurate indication of said speed in the latter temperature range and to exert a nominal influence on said torque relationship at temperatures below approximately 65° F., said compensating means also including a temperature compensating magnetic shunt having a negative temperature coefficient of magnetic permeability in the temperature range between approximately 65° F. and −40° F. and cooperable with said magnet and field plate to compensate for thermally induced changes in the torque relationship between said magnet and member to effect a substantially accurate indication of said speed in the latter temperature range, said shunt having a negligible temperature coefficient of magnetic permeability above approximately 65° F.

3. In a speed responsive indicator, a ceramic permanent magnet having a comparatively large negative temperature coefficient of magnetic flux density and mounted for angular movement, means having a negative temperature coefficient of electrical resistance and subject to torque as a function of the speed of said magnet for indicating said speed including an eddy current member mounted for angular movement in the path of the magnetic flux of said magnet, a field plate mounted in said path, and compensating means for neutralizing comparatively large temperature induced changes in the torque relationship between said magnet and member to effect a substantially accurate indication of said speed independently of changes in the ambient temperature, said compensating means comprising temperature responsive means for adjusting the distance between said field plate and magnet inversely with changes in ambient temperatures, said temperature responsive means being calibrated and arranged with respect to said magnet and member to exert its major influence on the torque relationship therebetween over a relatively high ambient temperature range to effect a substantially accurate indication of said speed in the latter temperature range and to exert a nominal influence on said torque relationship at temperatures below said latter range, said compensating means also including a temperature compensating magnetic shunt having a negative temperature coefficient of magnetic permeability in a relatively low ambient temperature range and cooperable with said magnet and field plate to compensate for thermally induced changes in the torque relationship between said magnet and member to effect a substantially accurate indication of said speed in said low temperature range, said shunt having a negligible temperature coefficient of magnetic permeability above said low temperature range.

4. In a speed responsive indicator, a permanent magnet having a comparatively large temperature coefficient of magnetic flux density and mounted for angular movement, means subject to torque as a function of the speed of said magnet for indicating said speed including an eddy current member mounted for angular movement in the path of the magnetic flux of said magnet, a field plate mounted in said path, and compensating means for neutralizing temperature induced changes in the torque relationship between said magnet and member to effect a substantially accurate indication of said speed independently of changes in the ambient temperature, said compensating means comprising temperature responsive means for adjusting the distance between said field plate and magnet with changes in ambient temperature, said temperature responsive means being calibrated and arranged with respect to said magnet and member to exert it major influence on the torque relationship therebetween over a relatively high ambient temperature range to effect a substantially accurate indication of said speed in the latter temperature range and to exert a nominal influence on said torque relationship at temperatures below said latter range, said compensating means also including a temperature compensating magnetic shunt having a temperature coefficient of magnetic permeability in a relatively low ambient temperature range and cooperable with said magnet and field plate to compensate for thermally induced changes in the torque relationship between said magnet and member to effect a substantially accurate indication of said speed in said low temperature range, said shunt having a negligible temperature coefficient of magnetic permeability above said low temperature range.

References Cited in the file of this patent
UNITED STATES PATENTS

| | | |
|---|---|---|
| 1,415,079 | Wood | May 9, 1922 |
| 2,232,789 | Kollsman | Sept. 25, 1941 |
| 2,698,917 | Van Urk | Jan. 4, 1955 |
| 2,722,617 | Cluwen | Nov. 1, 1955 |
| 2,851,,621 | Fauvelot | Sept. 9, 1958 |